United States Patent
Xing et al.

(10) Patent No.: US 10,202,314 B2
(45) Date of Patent: Feb. 12, 2019

(54) CONTROLLED RELEASE FERTILIZER EMPLOYING EPOXIDIZED FATTY ACID TRIGLYCERIDE OIL AS A COATING ADDITIVE

(75) Inventors: Baozhong Xing, Calgary (CA); Leslie L. Carstens, Thorhild (CA); Nick P. Wynnyk, Edmonton (CA)

(73) Assignee: Agrium, Inc., Calgary, Alberta (CA)

( * ) Notice: Subject to any disclaimer, the term of this patent is extended or adjusted under 35 U.S.C. 154(b) by 1881 days.

(21) Appl. No.: 12/063,577

(22) PCT Filed: Aug. 9, 2006

(86) PCT No.: PCT/CA2006/001315
§ 371 (c)(1),
(2), (4) Date: Jul. 15, 2010

(87) PCT Pub. No.: WO2007/016788
PCT Pub. Date: Feb. 15, 2007

(65) Prior Publication Data
US 2010/0307211 A1    Dec. 9, 2010

Related U.S. Application Data

(60) Provisional application No. 60/706,436, filed on Aug. 9, 2005.

(51) Int. Cl.
*C05G 3/00*         (2006.01)
(52) U.S. Cl.
CPC ................... *C05G 3/0041* (2013.01)
(58) Field of Classification Search
CPC .. C05G 3/0029; C05G 3/0035; C05G 3/0023; C05G 3/0041; C05C 9/00; C08G 18/36; C08G 18/3868; C08G 75/04; C08G 75/26; C08G 75/00; C07C 327/22; C09D 175/04; C11C 3/00
USPC ...................................... 71/23–49
See application file for complete search history.

(56) References Cited

U.S. PATENT DOCUMENTS

| | | | |
|---|---|---|---|
| 3,223,518 A | 12/1965 | Hansen | |
| 3,259,482 A * | 7/1966 | Hansen | 71/64.11 |
| 3,264,089 A * | 8/1966 | Hansen | 71/64.11 |
| 3,424,766 A | 1/1969 | Masters | |
| 3,699,061 A | 10/1972 | Cunningham | |
| 4,042,366 A | 8/1977 | Fersch et al. | |
| 4,772,490 A | 9/1988 | Kogler et al. | |
| 5,538,531 A * | 7/1996 | Hudson et al. | 71/28 |
| 5,571,303 A | 11/1996 | Bexton | |
| 5,607,633 A * | 3/1997 | Sleeter et al. | 264/115 |
| 5,803,946 A | 9/1998 | Petcavich et al. | |
| 5,827,540 A | 10/1998 | Motojima et al. | |
| 6,176,891 B1 | 1/2001 | Komoriya et al. | |
| 6,231,633 B1 | 5/2001 | Hirano et al. | |
| 6,663,686 B1 * | 12/2003 | Geiger et al. | 71/28 |
| 2002/0077377 A1 * | 6/2002 | Zhang et al. | 521/82 |
| 2005/0197390 A1 * | 9/2005 | Byers | C05C 9/00 514/513 |

FOREIGN PATENT DOCUMENTS

| | | |
|---|---|---|
| CA | 2272480 A1 | 11/1999 |
| CA | 2412532 A1 | 1/2002 |
| EP | 0867422 A2 | 9/1998 |
| EP | 1 172 347 A2 | 1/2002 |
| FR | 2 204 653 A1 | 5/1974 |
| GB | 1453258 B1 | 10/1976 |
| GB | 1482213 B1 | 8/1997 |
| JP | 08-231301 A | 9/1996 |
| JP | 08231301 A * | 9/1996 |
| JP | 10-265288 A | 10/1998 |
| JP | 10-291881 A | 11/1998 |
| JP | 2000-44377 A | 2/2000 |
| JP | 2001-247392 A | 9/2001 |
| JP | 2004-501855 A | 1/2004 |
| WO | 02/00573 A2 | 1/2002 |

OTHER PUBLICATIONS

International Search Report for the corresponding International Patent Application PCT/CA-2006/001315.
Jul. 17, 2012 Office Action for Canadian Patent Application No. 2,618,592.
Mar. 5, 2012 Second Office Action for Chinese Patent Application No. 200680037231.3.
English translation of the Sep. 1, 2010 First Office Action for Chinese Patent Application No. 200680037231.3.
Jun. 6, 2012 Extended European Search Report for European Patent Application No. EP 06 77 5095.
Feb. 7, 2012 Office action for Japanese Patent Application No. 2008-525351, a letter from Suzuye & Suzuye summarizing the office action in English and an English translation of the reasons for rejection.
The Third Office Action for Chinese Patent Application No. 200680037231.3 and an English translation thereof, dated Oct. 10, 2012.
Office Action for European Patent Application No. 06 775 095.0 dated Mar. 25, 2013.
GPS Safety Summary, Ethylendiamine, propoxylated, BASF The Chemical Company, Jul. 2013, pp. 1-6.
Jeffol Polyether Polyols Product Line 2010, Huntsman Corporation, 2010, pp. 1-2.
Thomas, Derrick Scott, Critical Analysis and Review of Flash Points of High Molecular Weight Poly-Functional, C, H, N, O Compounds, Texas A&M University, Master of Science Thesis, May 2011, pp. 1-109.
Office Action for European Patent Application No. 06775095.0 dated Jun. 12, 2014.
English translation of the first Office Action for Japanese Patent Application No. 2008-525351 dated Jun. 4, 2013.
Extended European Search Report issued in EP Application 16150249.7, dated Mar. 31, 2016, 6 pages.

* cited by examiner

*Primary Examiner* — Jennifer A Smith

(57) ABSTRACT

A controlled release fertilizer material comprising a particulate plant nutrient surrounded by at least one coating comprising the reaction product of a mixture comprising a polyol, an isocyanate, a wax and an epoxidized fatty acid triglyceride oil.

25 Claims, No Drawings

CONTROLLED RELEASE FERTILIZER EMPLOYING EPOXIDIZED FATTY ACID TRIGLYCERIDE OIL AS A COATING ADDITIVE

FIELD OF THE INVENTION

In one of its aspects, the present invention relates to a controlled release fertilizer (also referred to throughout this specification as "CRF") having improved mechanical handling durability. In another of its aspects, the present invention relates to a process for producing such a CRF.

DESCRIPTION OF THE PRIOR ART

Fertilizers have been used for many years to supplement nutrients in growing media.

In recent years, the art has focused on techniques to deliver controlled amounts of plant nutrients to the soil or other growing media. This has been done so that, on the one hand, the growing plants are not adversely deprived of nutrients and, on the other hand, an over-supply of nutrients is avoided. An over-supply of nutrients can result in toxicity to the plants or losses from leaching. The resulting improvement in FUE (fertilizer use efficiency) can reduce the rate and the frequency of nutrient application. A CRF can provide the nutrients for plants according to their requirements.

U.S. Pat. No. 5,538,531 [Hudson et al. (Hudson)] and the prior art cited therein provides an overview of methods of conveying controlled release properties to a particulate plant nutrient. Specifically, Hudson teaches a controlled release particulate fertilizer product having a water soluble fertilizer central mass encased in a plurality of water insoluble, abrasion resistant coatings. At least one inner coating is a urethane reaction product derived from reacting recited isocyanates and polyols. The outer coating is formed from an organic wax having a drop melting point in the range of from 50° C. to 120° C. The Hudson process involves curing the urethane coating(s) around the particulate plant nutrient and, thereafter, applying to the cured urethane coating(s) the outer layer of organic wax.

U.S. Pat. No. 5,803,946 [Petcavich et al. (Petcavich)] teaches a urea particulate plant nutrient having on its surface an interpenetrating polymer network comprising a biuret, a urethane and tung oil. Petcavich further teaches that it is advantageous to apply wax to the plant nutrient either before or after the application of the polymer network components.

U.S. Pat. No. 6,231,633 [Hirano et al.] teaches a granular fertilizer coated with a thermosetting resin coating that may be urethane and a hydrophobic compound, which may be a wax.

U.S. Pat. No. 6,663,686 [Geiger et al. (Geiger)] teaches a slow-release polyurethane encapsulated fertilizer using polyurethane and wax. Specifically, Geiger teaches a process in which wax is used as a component of the polyurethane coating, not only as a separate over-coat for the CRF (i.e., as described by Hudson). Geiger's desired controlled release profiles can be achieved with relatively less coating materials and by a relatively simple procedure (see Geiger's Examples 1-3).

Generally, wax is added to the polymer coating of a CRF to control the rate of nutrient release. This in turn, permits the reduction of coat thickness, which reduces cost. Thus, the coating on a CRF is typically very thin—e.g., on the order of from about 3 to about 50 microns. Practically, a CRF is subject to being handled extensively during the period from production thereof through to application thereof as a fertilizer. For example, after production, the CRF is usually conveyed, packaged and transported. Transportation of the CRF can take place a number of times—e.g., between one or more of the CRF producer, the distributor, the wholesaler, the retailer, the customer and the like. Once in the possession of the customer, the CRF typically is "de-packaged", transferred to distribution equipment and, finally, applied as a fertilizer. Thus, the cumulative effect of such handling of the CRF, during the period from production thereof through to application thereof, render the relatively thin coating typically applied on the CRF susceptible to physical damage. If the coating is damaged during handling, the nutrient release rate profile of the fertilizer can be significantly changed resulting in an unpredictable and/or undesired nutrient release rate for the CRF. This can be catastrophic in many commercial agricultural applications.

Further, the present inventors have discovered that, in certain instances, an increase in wax content may correlate with a decrease in the strength of the coating. More specifically, under certain circumstances, the mechanical handling durability of the fertilizer may decrease when the wax content reaches a certain level. While not wishing to be bound by an particular theory or mode of action, this decrease in durability is believed to be the result of incompatibility between the wax and the polymer coating.

Furthermore, the present inventors have discovered that, in certain instances, an increase in rigidity of the coating may correlate with an increase in the strength of the coating. More specifically, the strength of the coating determines the mechanical handling durability of the coated fertilizer. Normally the strength increase of the coating will cause the rigidity increase of the coating. The high rigidity will make the coating brittle. Under certain circumstances, the mechanical handling durability of the coated fertilizer may decrease when the rigidity reaches a certain level even though the coating strength is high. While not wishing to be bound by an particular theory or mode of action, this decrease in durability is believed to be the result of brittleness of the polymer coating.

The wax levels, coating film strength and rigidity can affect the release rate profile and mechanical handling durability of the fertilizer. Under certain circumstances, the preferred coating will have a high wax content and high strength in order to achieve the desired release rate profile and/or thin coating. This may cause a decrease in the mechanical handling durability of the fertilizer.

While a slow-release polyurethane encapsulated fertilizer in which wax is in the polyurethane coating, such as is taught by Geiger, represents a significant improvement in the art, there remains room for improvement. Specifically, it would be advantageous to have controlled release fertilizers having improved properties, inter alia, including improved mechanical handling durability at various wax levels and coating film strength and rigidity levels. It would also be advantageous to be able to produce a CRF having a desirable combination of the following features: (i) a relatively thin coating; (ii) a reliable desired nutrient release rate profile; and (iii) a resistance to damage to the coating resulting from mechanical handling between production and application of the CRF.

SUMMARY OF THE INVENTION

It is an object of the present invention to provide a novel controlled release fertilizer that obviates or mitigates at least one of the above-mentioned disadvantages of the prior art.

It is another object of the present invention to provide a novel process for production of a controlled release fertilizer.

Accordingly, in one of its aspects, the present invention provides a controlled release fertilizer material comprising a particulate plant nutrient surrounded by at least one coating comprising the reaction product of a mixture comprising a polyol, an isocyanate, a wax and an epoxidized fatty acid triglyceride oil.

In another of its aspects, the present invention provides a controlled release fertilizer material comprising a particulate plant nutrient surrounded by at least one polyurethane coating containing a wax; the polyurethane coating further comprising an epoxidized fatty acid triglyceride oil in an amount effective to improve mechanical handling durability of the controlled release fertilizer material.

In yet another of its aspects, the present invention provides a process for producing a controlled release fertilizer material comprising the step of contacting a particulate plant nutrient with a polyol, an isocyanate, a wax and an epoxidized fatty acid triglyceride oil.

In yet another of its aspects, the present invention provides a process for producing a controlled release fertilizer material comprising the step of contacting a particulate plant nutrient with a polyol, an isocyanate, a wax and an epoxidized fatty acid triglyceride oil in an amount effective to improve mechanical handling durability of the controlled release fertilizer material.

The inventors of the subject invention have surprisingly and unexpectedly discovered that selection of an epoxidized fatty acid triglyceride oil as an additive (e.g., as a compatibilizer and plasticizer) in a coating formed of a polyol, an isocyanate, and a wax advantageously improves the durability properties of the fertilizer during handling and storage. Specifically, while it is known to use coatings such as polyurethane coatings to control the release rate of the nutrients in the fertilizer to the surrounding soil at a specified rate, problems are often experienced when the coated product is exposed to mechanical handling (e.g., during blending with other materials, packaging, transportation and the like). Thus, when the coating is damaged during handling, the release profile of the product can be severely altered.

Surprisingly, the use of an epoxidized fatty acid triglyceride oil as an additive (e.g., as a compatibilizer and plasticizer) has been found to reduce the deleterious impact of handling on the release profile of the product. Epoxidized fatty acid triglyceride oils appear to be unique compared to conventional potential compatibilizers and plasticizers in their ability to reduce the impact of handling on the release profile of a controlled release fertilizer having a polyol, isocyanate and wax coating formulation. In other words, epoxidized fatty acid triglyceride oils appear to be unique in their ability to improve the mechanical handling durability of a CRF material comprising a polyol, isocyanate, and wax coating.

In this specification, "improved mechanical handling durability" is intended to mean that the release rate after the Paint Shaker test (as described below) of a CRF material of a given formulation is retarded (the test material) compared to the release rate under the same conditions of a CRF material of another formulation after the Paint Shaker test (the control material).

DETAILED DESCRIPTION OF THE PREFERRED EMBODIMENTS

Accordingly, in one of its aspects, the present invention relates to a CRF material comprising a particulate plant nutrient surrounded by at least one coating.

In another of its aspects, the present invention relates to a CRF material comprising a particulate plant nutrient surrounded by at least one coating of the reaction product of a mixture comprising a polyol, an isocyanate, a wax and an epoxidized fatty acid triglyceride oil.

The choice of particulate plant nutrient material useful for the present CRF material is not particularly restricted and is within the purview of a person skilled in the art.

For example, the plant nutrient material used may be selected from those disclosed in Hudson. Preferably, such a plant nutrient comprises a water soluble compound, more preferably a compound containing at least one member selected from the group consisting of nitrogen, phosphorus, potassium, sulfur, micronutrients and mixtures thereof. A preferred such plant nutrient comprises urea. Other useful examples of plant nutrients are taught in U.S. Pat. No. 5,571,303 [Bexton]—e.g., ammonium sulfate, ammonium phosphate and mixtures thereof. Non-limiting examples of useful micronutrients may be selected from the group comprising copper, zinc, boron, manganese, iron and mixtures thereof.

Preferably, the coating surrounds the plant nutrient material in an amount in the range of from about 0.1 to about 10 percent by weight, more preferably from about 0.5 to about 5.0 percent by weight, and most preferably from about 0.7 to about 4.0 percent by weight, based on the weight of the plant nutrient material.

The choice of polyol is not particularly restricted and is within the purview of a person skilled in the art. A polyol here refers to an active hydrogen containing compound reactive with isocyanate. The polyol may be a single type of polyol or a mixture of different polyols. For example, the polyol may be a hydroxyl-terminated backbone of a member selected from the group comprising polyether, polyester, polycarbonate, polydiene and polycaprolactone. Preferably, such a polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising polyethylene glycols, adipic acid-ethylene glycol polyester, poly(butylene glycol), poly (propylene glycol) and hydroxyl-terminated polybutadiene—see, for example, British patent No. 1,482,213. The most preferred such polyol is a polyether polyol. Preferably, such a polyether polyol has a molecular weight in the range of from about 60 to about 20,000, more preferably from about 60 to about 10,000, and most preferably from about 60 to about 8,000.

A particularly preferred class of polyols are polyols comprising from about 2 to about 12 hydroxyl moieties. Preferably, such polyols are those with low equivalent weight and high functionality. The preferred equivalent weight is 29-400. More preferably, the equivalent weight is 29-200. Most preferably, the equivalent weight is 29-150. The functionality of the polyol as used herein refers to the preferred functionality of the basic unit (or monomer). Preferably, the functionality of the polyol is between about 2 and about 12, more preferably between about 3 and about 8, and most preferably between about 3 and about 6. More preferably, such a polyether polyol is made by using an amine as initiator. Most preferably, the polyol comprises a mixture of Huntsman Jeffol A480™ and another polyol, preferably, castor oil.

Additionally, the polyol may be derived from fatty acid triglyceride sources such as soybean, corn, canola and the like (i.e., to produce naturally occurring modified oils). An example of such a synthetic polyol comprising a canola base is commercially available from Urethane Soy Systems Corp. (Princeton, Ill.) with a functionality of above 3.

A mixture of polyols with a prescribed ratio and molecular weight distribution may be used, for example, Huntsman Jeffol A480™ or 800™ with ethylene glycol, Huntsman Jeffol A480™ or 800™ with oleo polyol, Huntsman Jeffol A480™ or 800™ with polyethylene glycol, Huntsman Jeffol A480™ or 800™ with polypropylene glycol, Huntsman Jeffol A480™ or 800™ with a polypropylene (or polyethylene) glycol mixture of different functionality and molecular weight.

The isocyanate suitable for used in producing the coating is not particularly restricted and the choice thereof is within the purview of a person skilled in the art. The isocyanate may be a single type of isocyanate or a mixture of different isocyanates. Generally, the isocyanate compound suitable for use may be represented by the general formula:

$$Q(NCO)_i,$$

wherein i is an integer of two or more and Q is an organic radical having the valence of i. Q may be a substituted or unsubstituted hydrocarbon group (e.g. an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, —S—, —S-$Q^1$-S— and —SO$_2$—. Examples of isocyanate compounds which fall within the scope of this definition include hexamethylene diisocyanate, 1,8-diisocyanato-p-naphthalene, xylyl diisocyanate, (OCNCH$_2$CH$_2$CH$_2$OCH$_2$O)$_2$, 1-methyl-2,4-diisocyanato-cyclohexane, phenylene diisocyanates, tolylene diisocyanates, chlorophenylene diisocyanates, diphenylmethane-4, 4N-diisocyanate, naphthalene-1,5-diisocyanate, triphenylmethane-4,4N,40-triisocyanate and isopropylbenzene-alpha-4-diisocyanate.

In another embodiment, Q may also represent a polyurethane radical having a valence of i. In this case Q(NCO)$_i$, is a compound which is commonly referred to in the art as a prepolymer. Generally, a prepolymer may be prepared by reacting a stoichiometric excess of an isocyanate compound (as discussed hereinabove) with an active hydrogen-containing compound, preferably the polyhydroxyl-containing materials or polyols discussed above. In this embodiment, the polyisocyanate may be, for example, used in proportions of from about 5 percent to about 200 percent stoichiometric excess with respect to the proportion of hydroxyl in the polyol.

The isocyanate compound suitable for use in the process of the present invention also may be selected from dimers and trimers of isocyanates and diisocyanates, and from polymeric diisocyanates having the general formula:

$$[Q''(NCO)_i]_j$$

wherein both i and j are integers having a value of 2 or more, and Q" is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also, for example, British patent No. 1,453,258.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

A particularly preferred group of isocyanates are those described in Hudson.

Preferably, the isocyanate contains from about 1.5 to about 16 NCO groups per molecule. More preferably, the isocyanate contains from about 2 to about 16 NCO groups per molecule. Most preferably, the isocyanate contains from about 3 to about 16 NCO groups per molecule.

Preferably, the isocyanate contains from about 10 to about 50 percent NCO by weight. More preferably, the isocyanate contains from about 12 to about 50 percent NCO by weight. Most preferably, the isocyanate contains from about 15 to about 50 percent NCO by weight.

Preferably, the polyol and isocyanate are used in amounts such that the ratio of NCO groups in the isocyanate to the hydroxyl groups in the polyol is in the range of from about 0.5 to about 3.0, more preferably from about 0.8 to about 2.0, most preferably from about 0.9 to about 1.1.

The choice of wax is not particularly restricted and is within the purview of a person skilled in the art. The wax may be a single type of wax or a mixture of different waxes. The term wax as used herein refers generally to a substance that can provide hydrophobicity to the coating and is not restricted to ordinary waxes. The wax for example may be selected from the group comprising, fatty acid oil, asphalt, beeswax, and petroleum product. The wax may be selected from the group comprising esters, ethers and alcohols.

Preferably, the wax used in the mixture to produce the coating may be selected from alpha olefin waxes, polyethylene wax, paraffin wax, microcrystalline wax and nature waxes. Suitable waxes include those described in Hudson and silicon waxes (commercially available from Dow Corning). The preferred wax comprises a drop melting point of at least about 20° C., preferably in the range of from about 40° C. to about 120° C., and more preferably in the range of from about 50° C. to about 120° C. Preferably, the wax is substantially non-tacky below a temperature of about 40° C. The preferred wax comprises a C$_{20+}$ alpha olefin, more preferably a C$_{20-100}$ alpha olefin.

The epoxidized fatty acid triglyceride oil suitable for use in producing the coating is not particularly restricted and is within the purview of a person skilled in the art. The epoxidized fatty acid tryiglyceride oil may be a single type of epoxidized fatty acid triglyceride oil or a mixture of different epoxidized fatty acid triglyceride oils. The epoxidized fatty acid triglyceride oil may be derived from any naturally occurring triglyceride oil that can be epoxidized. Preferably, the fatty acid triglyceride oil (prior to epoxidization) is selected from the group comprising vegetable oil, fatty acid oil, tree seed oil and combinations thereof. More preferably, the fatty acid triglyceride oil (prior to epoxidization) is selected from corn oil, canola oil, sunflower oil, soy oil, linseed oil and combinations thereof. Most preferably, the fatty acid triglyceride oil (prior to epoxidization) comprises soy oil. The manner by which fatty acid triglyceride oil is epoxidized is not particularly restricted and is within the purview of a person of ordinary skill in the art. Epoxidized fatty acid triglyceride oil is a product processed further from fatty acid triglyceride oil. It contains epoxide groups in triglyceride oil. The epoxide groups can be introduced by oxidizing the unsaturated bonds in the triglyceride oil or dehydrating the glycols in triglyceride oil. For example, the epoxidized fatty acid triglyceride oil can be derived by oxidizing the double bonds in fatty acid triglyceride oil with oxygen or another oxidizer, such as peroxides. The content of epoxide groups in an epoxidized fatty acid triglyceride oil will depend on the content of unsaturated bonds in the fatty acid triglyceride oil and the degree of oxidization. It may change in a wide range. The content of epoxide groups in an epoxidized fatty acid triglyceride oil may vary over a wide range. Suitable epoxidized fatty acid triglyceride oils are commercially available, such as Elf Atochem Vikoflex 7170™.

Preferably, the epoxidized fatty acid triglyceride oil is present in an amount in the range of from about 0.1 to about 70 percent by weight, based on the total coating weight. More preferably, the epoxidized fatty acid triglyceride oil is present in an amount in the range of from about 1 to about 60 percent by weight, based on the total coating weight. Most preferably, the epoxidized fatty acid triglyceride oil is present in an amount in the range of from about 1 to about 40 percent by weight, based on the total coating weight.

Preferably, the wax and epoxidized fatty acid triglyceride oil are present in the coating in an amount of between about 0.1 percent and about 75 percent by combined weight, based on the total coating weight. More preferably, the wax and epoxidized fatty acid triglyceride oil are present in the coating in an amount of between about 1 percent and about 70 percent by combined weight, based on the total coating weight. Most preferably, the wax and epoxidized fatty acid triglyceride oil are present in the coating in an amount of between about 10 percent and about 65 percent by combined weight, based on the total coating weight.

The epoxidized fatty acid triglyceride oil is added in the amount of between about 0.5 percent and about 100 percent based on the combined weight of the epoxidized fatty acid triglyceride oil and wax. The epoxidized fatty acid triglyceride oil is preferably added in the amount of between about 5 percent and about 70 percent based on the combined weight of the epoxidized fatty acid triglyceride oil and wax. More preferably, the epoxidized fatty acid triglyceride oil is added in the amount of between about 15 percent and about 60 percent based on the combined weight of the epoxidized fatty acid triglyceride oil and wax. Most preferably, the epoxidized fatty acid triglyceride oil is added in the amount of between about 20 percent and about 40 percent based on the combined weight of the epoxidized fatty acid triglyceride oil and wax mixture.

The ratio of epoxidized fatty acid triglyceride oil to wax can vary with the particular epoxidized fatty acid triglyceride oil, isocyanate, wax and polyol used. The specifics for a particular combination of these components can be readily determined by a person of ordinary skill in the art having the present specification in hand.

There is a preferred range for the level of epoxidized fatty acid triglyceride oil added to the coating. Generally, at a given total content of epoxidized fatty acid triglyceride oil and wax, when the level of epoxidized fatty acid triglyceride oil added is lower than the optimal range, as the level of the epoxidized fatty acid triglyceride oil in the wax and epoxidized fatty acid triglyceride oil mixture increases, the release rate of the CRF decreases until the epoxidized fatty acid triglyceride oil level reaches an optimal value. When the level of epoxidized fatty acid triglyceride oil added is higher than the optimal range, as the level of epoxidized fatty acid triglyceride oil in the wax and epoxidized fatty acid triglyceride oil mixture increases, the release rate of the CRF material increases. The optimal range of the level of epoxidized fatty acid triglyceride oil in the wax and epoxidized fatty acid triglyceride oil mixture is different for the CRF before and after the Paint Shaker test (described below).

At a certain level of epoxidized fatty acid triglyceride oil, relative to the level of wax in the coating, the epoxidized fatty acid triglyceride oil may bleed out or be extracted out by a fresh surface or material, such as paper or plastic film, from the coating. This is because epoxidized fatty acid triglyceride oils exist mostly in a liquid state. The bleeding out is due to the saturation of epoxidized fatty acid triglyceride oil in the coating. When the epoxidized fatty acid triglyceride oil bleeds out or is extracted out of the coating, channels for water permeation are created due to the porous structure left in the coating, which can significantly increase the release rate. It is important to determine the proper ratio of epoxidized fatty acid triglyceride oil to wax and to polymer coating components. The proper ratio should be determined according to the properties of the selected epoxidized fatty acid triglyceride oil, wax, and polymer coating components. Determining the proper ratio for a given selection of components is within the purview of a person skilled in the art.

Embodiments of the present invention will be illustrated with reference to the following Examples which should not be used to limit or construe the invention.

EXAMPLE 1

In this Example, the effect of the addition of an epoxidized fatty acid triglyceride oil, namely epoxidized soy oil (ESO) was demonstrated at a 2.7% coat weight.

Two products were produced, one with and one without ESO as a coating additive.

A stainless steel horizontal insulated drum having a 12 inch diameter and 5½ inch length was used to apply the coating components to the particulate fertilizer. An enclosed back plate was attached to a variable speed drive. The front plate had a central 8 inch opening through which the substrate and the coating components were added. Internally, the drum consisted of four substantially evenly spaced longitudinal baffles, each being about ½ inch in height. The drum was rotated at 75 fpm peripheral speed or about 24 rpm. The internal temperature of the drum and substrate was maintained at about 60° C. using a variable setting electric heating gun. The coating components were added using individual syringes for each coating component. The syringes were capable of adding the desired weight of each coating component in a single addition.

The formulations, based upon the weight amount per layer in grams, for the coating components are shown in Table 1.

To form each product, a 1 kilogram charge of urea fertilizer (SGN 260) at 60° C. was coated with three coating layers, each prepared according to the formulation in Table 1. Each coating layer was applied by first applying a prepared, preheated (100° C.) mixture of Huntsman Jeffol A480 (polyol) and Chevron/Phillips Gulftene C30+ (wax), with/without Elf Atochem Vikoflex 7170 (ESO) using the formulations set out in Table 1. Immediately following this application, BASF Isocyanate #17 (PAPI 17) was applied. Curing between layers was permitted for 3½ minutes.

After the final coating layer was applied and permitted to cure, the drum was rotated, while a stream of ambient air was applied to cool the product to about 40° C. The product was then removed from the drum and placed in a labelled bag. By this process, a total coat weight of 2.7% was applied.

The water release profile of the products was determined before and after the "Paint Shaker test" which facilitates evaluation of the mechanical handling durability of the CRF by subjecting it to the action of significant mechanical forces in a relatively short period of time thereby mimicking realistic handling of the CRF as described above.

The "Paint Shaker" test is conducted in a paint shaker machine. First 200 grams of the CRF are placed in a 6 inch diameter by 5½ inch long metal can with lid. Then 8 (¼ inch by ½ inch) machine bolts with slotted heads and 8 (¼ inch) square head nuts are added into the can. The can containing the CRF, nuts and bolts is then placed securely in a paint conditioner/shaker (Red Devil, ¼H.P. model). The test sample is vigorously conditioned in the paint shaker at a frequency of 730 cycles per minute for 6 minutes. The operating time is controlled with an electronic timer (Gralab model 451) that automatically stops the paint shaker at the preset time. After the paint shaker cycling is complete, the can is removed and the nuts and bolts are removed by passing the contents through a Tyler Standard 3½ mesh screen. The CRF is collected in a pan and returned to its sample bag for the release rate analysis.

The water release rate profile for the controlled release fertilizer material before and after the Paint Shaker test was then determined. In the analysis, a Technicon AutoAnalyzer™ was calibrated and used pursuant to the teachings of Automated Determination of Urea and Ammoniacal Nitrogen (University of Missouri, 1980). The following procedure was used:

1. Accurately weigh 15 grams (±0.1 mg) of the sample into a weigh dish. Record the weight of sample. Transfer the sample to 125 mL Erlenmeyer flask.
2. Add 75 mL of demineralized water and stopper the flask.
3. Gently swirl the sample and water until all the particles are submersed.
4. Let the sample stand for a specified time at a constant temperature (typically at room temperature).
5. Gently swirl the flask to mix the solution and decant only the solution to a 100 mL volumetric flask.
6. Rinse the sample with demineralized water adding to the volumetric flask.
7. Bulk to volume of volumetric flask and mix thoroughly.
8. If the test is to be repeated for another time period, repeat starting at Step 2.
9. Once the Technicon AutoAnalyzer II is on line, transfer some of this solution (or perform the required dilutions if necessary) to the Technicon sample cups for analysis.
10. Record the results as parts per million N—NH$_3$ (read directly from a Shimadzu Integrator).

The water release profiles of the products are provided in Table 2.

As shown in Table 2, at a 2.7% coat weight, fertilizer having a coating containing an epoxidized fatty acid triglyceride oil had improved mechanical handling durability compared to a fertilizer having a coating without epoxidized fatty acid triglyceride oil. After the Paint Shaker test, the percentage nitrogen released was lower for a fertilizer having a coating containing epoxidized fatty acid triglyceride oil compared to a fertilizer having a coating without epoxidized fatty acid triglyceride oil at Days 1, 7 and 28.

EXAMPLE 2

In this Example, the effect of the addition of an epoxidized fatty acid triglyceride oil (epoxidized soy oil ("ESO")) is demonstrated at a 2.1% coat weight.

The procedure used in Example 1 was followed to apply the coating components to the urea fertilizer. The formulations, based upon the weight amount per layer in grams, for the coating components of this Example are provided in Table 3.

The products were subjected to the Paint Shaker test described above.

The water release profiles of each product was determined before and after the Paint Shaker test. The water release profiles of the products of this Example are provided in Table 4.

As shown in Table 4, at a 2.1% coat weight, fertilizer having a coating containing an epoxidized fatty acid triglyceride oil had improved mechanical handling durability compared to a fertilizer having a coating without epoxidized fatty acid triglyceride oil. After the Paint Shaker test, the percentage nitrogen released was lower for a fertilizer having a coating containing epoxidized fatty acid triglyceride oil compared to a fertilizer having a coating without epoxidized fatty acid triglyceride oil at Days 1, 7 and 28.

EXAMPLE 3

In this Example, the effect of the level of epoxidized fatty acid triglyceride oil (ESO) in the epoxidized fatty acid triglyceride oil and wax mixture is illustrated.

Thus, formulations with varying percentage ESO in the ESO/wax mixture were used to coat urea fertilizer according to the general procedure used in Example 1. For each product of this Example, total weight of the coatings was 2.7% by weight of the product. The total percentage of ESO/wax mixture based on total coating weight was fixed at 55%. The formulations, based upon the weight amount per layer in grams, for the coating components are provided in Table 5.

The products were subjected to the Paint Shaker test described above.

The water release profile of each product was determined before and after the Paint Shaker test. The water release profiles of the products of this Example are provided in Table 6.

As shown in Table 6, fertilizer having a coating containing between 5 and 50 percent epoxidized fatty acid triglyceride oil in the epoxidized fatty acid triglyceride oil and wax mixture generally demonstrated improved mechanical handling durability compared to a fertilizer having a coating without epoxidized fatty acid triglyceride oil. After the Paint Shaker test, the percent nitrogen released was generally lower for fertilizers having coatings of these percentages of epoxidized fatty acid triglyceride oil, compared to a fertilizer having a coating without epoxidized fatty acid triglyceride oil. The mechanical handling durability improved most at ESO content of 20-30% based on the total weight of ESO/wax mixture. This optimal range may vary with content of ESO/wax mixture in the total coating or other parameters.

EXAMPLE 4

This Example illustrates the use of various polyols in CRF according to the present invention. Huntsman A480, A800, and SD 361 polyols were used. The procedure used in Example 1 was followed to apply the coating components to the urea fertilizer. For each product of this Example, total weight of the coatings was 2.7% by weight of the product. The formulations, based upon the weight amount per layer in grams, for the coating components are set out in Table 7.

The products were subjected to the Paint Shaker test described above.

The water release profiles of each product was determined before and after the Paint Shaker test. The water release profiles of the products of this Example are provided in Table 8.

As shown in Table 8, the choice of polyol in the formulation of a coating according to the present invention can affect the water release profile of the fertilizer and the mechanical handling durability improvement.

EXAMPLE 5

This Example illustrates the use of various isocyanates in CRF according to the present invention. The procedure used in Example 1 was followed to apply the coating components to the urea fertilizer. For each product of this Example, a total weight of the coatings was 2.7% by weight of the product. The formulations, based upon the weight amount per layer in grams, for the coating components are provided in Table 9.

The products were subjected to the Paint Shaker test described above.

The water release profiles of each product were determined before and after the Paint Shaker test. The water release profiles of the products of this Example are provided in Table 10.

While as shown in Tables 2 and 4, the advantages of the present invention are observed in fertilizers having coating formulations using different isocyanates, as shown in Table 10, the choice of isocyanate affects the water release profile of the fertilizer and mechanical handling durability improvement.

EXAMPLE 6

This Example illustrates the use of various waxes in CRF according to the present invention. The procedure used in Example 1 was followed to apply the coating components to the urea fertilizer. The three waxes tested were Chevron/Phillips Gulftene C30+, Chevron/Phillips C30HA and Calwax Amber 185. For each product of this Example, total weight of the coatings was 2.7% by weight of the product. The formulations, based upon the weight amount per layer in grams, for the coating components are provided in Table 11.

The products were subjected to the Paint Shaker test described above.

The water release profiles of each product was determined before and after the Paint Shaker test. The water release profiles of the products of this Example are provided in Table 12.

As shown in Table 12, the choice of wax in the formulation of a coating according to the present invention can affect the water release profile of the fertilizer and the mechanical handling durability improvement.

EXAMPLE 7

In this Example, the effect of the amount of ESO and wax mixture, independent of the ratio of ESO to wax, was investigated. Three formulations of varying percentage ESO and wax level in the coating were applied to urea fertilizer according to the procedure in Example 1. The ESO to wax ratio was held constant at 30:70. For each product of this Example, total weight of the coatings was 2.7% by weight of the product. The formulations, based upon the weight amount per layer in grams, for the coating components are shown in Table 13.

The water release profiles of the samples, before and after the Paintshaker test, were determined. The Paintshaker test was performed in accordance with the procedure followed in Example 1. The water release profiles of the samples are shown in Table 14.

As shown in Table 14, the mechanical handling durability of a fertilizer having a coating of the present invention is affected by the percent epoxidized fatty acid triglyceride oil and wax in the total coating mixture when the epoxidized fatty acid triglyceride oil to wax ratio is kept constant.

While the present invention has been described in detail, including reference to the Examples, it will of course be readily understood that a number of modifications to the exemplified embodiment will be apparent to those of skill in the art with this specification in hand, which modifications do not depart from the spirit and scope of the present invention.

TABLE 1

|  | No ESO added grams/layer 3 layers applied | With ESO added grams/layer 3 layers applied |
|---|---|---|
| Jeffol A480 | 1.82 | 1.82 |
| ESO | 0 | 1.49 |
| Gulftene C30+ | 4.96 | 3.47 |
| Polyol mix total | 6.78 | 6.78 |
| PAPI 17 | 2.22 | 2.22 |
| Total | 9.00 | 9.00 |

TABLE 2

Percentage Nitrogen Release (Cumulative)

|  | Before paint shaker test | | | After paint shaker test | | |
|---|---|---|---|---|---|---|
|  | Day 1 | Day 7 | Day 28 | Day 1 | Day 7 | Day 28 |
| No ESO | 1.42 | 3.28 | 61.43 | 55.74 | 97.27 | 100 |
| With ESO | 0.50 | 6.66 | 32.52 | 1.06 | 9.40 | 37.55 |

TABLE 3

|  | No ESO added grams/layer 3 layers applied | With ESO added grams/layer 3 layers applied |
|---|---|---|
| Jeffol A480 | 1.74 | 1.51 |
| ESO | 0 | 0.70 |
| Gulftene C30HA | 1.54 | 1.54 |
| Polyol mix total | 3.28 | 3.75 |
| Huntsman Suprasec 9565 | 3.72 | 3.25 |
| Total | 7.00 | 7.00 |

TABLE 4

Percentage Nitrogen Release (Cumulative)

|  | Before paint shaker test | | | After paint shaker test | | |
|---|---|---|---|---|---|---|
|  | Day 1 | Day 7 | Day 28 | Day 1 | Day 7 | Day 28 |
| No ESO | 0.78 | 12.60 | 54.25 | 10.93 | 35.63 | 69.88 |
| With ESO | 0.49 | 8.34 | 55.58 | 5.11 | 20.93 | 56.26 |

TABLE 5 grams/layer, 3 layers applied

| % ESO in ESO/wax | 0 | 5 | 10 | 20 | 30 | 40 | 50 |
|---|---|---|---|---|---|---|---|
| Jeffol A480 (grams) | 1.82 | 1.82 | 1.82 | 1.82 | 1.82 | 1.82 | 1.82 |
| ESO | 0 | 0.25 | 0.50 | 0.99 | 1.49 | 1.98 | 2.48 |
| Gulftene C30+ | 4.96 | 4.71 | 4.46 | 3.97 | 3.47 | 2.97 | 2.48 |
| Polyol mix total | 6.78 | 6.78 | 6.78 | 6.78 | 6.78 | 6.77 | 6.78 |
| PAPI 17 | 2.22 | 2.22 | 2.22 | 2.22 | 2.22 | 2.23 | 2.22 |
| Total | 9.00 | 9.00 | 9.00 | 9.00 | 9.00 | 9.00 | 9.00 |

TABLE 6

Percentage Nitrogen Release (Cumulative)

|  | Before paint shaker test | | | After paint shaker test | | |
|---|---|---|---|---|---|---|
| % ESO | Day 1 | Day 7 | Day 28 | Day 1 | Day 7 | Day 28 |
| 0 | 1.42 | 3.28 | 61.43 | 55.74 | 97.27 | 100 |
| 5 | 1.99 | 2.35 | 9.55 | 40.72 | 92.76 | 100 |
| 10 | 1.56 | 2.06 | 12.53 | 14.36 | 38.67 | 66.60 |
| 20 | 0.92 | 2.35 | 15.68 | 2.00 | 10.28 | 36.04 |
| 30 | 0.50 | 6.66 | 32.52 | 1.06 | 9.40 | 37.55 |
| 40 | 0.71 | 9.19 | 43.44 | 0.42 | 12.31 | 52.21 |
| 50 | 0.01 | 15.53 | 66.65 | 2.49 | 25.07 | 77.44 |

TABLE 7

|  | A480 polyol grams/layer 3 layers applied | A800 polyol grams/layer 3 layers applied | SD 361 polyol grams/layer 3 layers applied |
|---|---|---|---|
| Jeffol A480 | 1.82 | 0 | 0 |
| Jeffol A800 | 0 | 1.31 | 0 |
| SD 361 | 0 | 0 | 2.86 |
| ESO | 1.49 | 1.49 | 1.49 |
| Gulftene C30+ | 3.47 | 3.47 | 3.47 |
| Polyol mix total | 6.78 | 6.27 | 7.82 |
| PAPI 17 | 2.22 | 2.73 | 1.18 |
| Total | 9.00 | 9.00 | 9.00 |

TABLE 8

Percentage Nitrogen Release (Cumulative)

|  | Before paint shaker test | | | After paint shaker test | | |
|---|---|---|---|---|---|---|
|  | Day 1 | Day 7 | Day 28 | Day 1 | Day 7 | Day 28 |
| A480 | 1.28 | 4.86 | 25.67 | 1.42 | 7.52 | 35.47 |
| A800 | .21 | 1.56 | 15.46 | 1.21 | 7.02 | 30.10 |
| SD 361 | 26.64 | 92.26 | 98.87 | 45.29 | 99.88 | 100 |

TABLE 9

|  | PAPI 17 | Huntsman Suprasec 9565 | Huntsman Rubinate 9511 |
|---|---|---|---|
| Jeffol A480 | 1.82 | 1.29 | 1.19 |
| ESO | 1.49 | 1.49 | 1.49 |
| Gulftene C30+ | 3.47 | 3.47 | 3.47 |
| Polyol mix total | 6.78 | 6.25 | 6.15 |
| PAPI 17 | 2.22 |  | 2.22 |
| Suprasec 9565 |  | 2.75 |  |
| Rubinate 9511 |  |  | 2.85 |
| Total | 9.00 | 9.00 | 9.00 |

TABLE 10

Percentage Nitrogen Release (Cumulative)

|  | Before paint shaker test | | | After paint shaker test | | |
|---|---|---|---|---|---|---|
|  | Day 1 | Day 7 | Day 28 | Day 1 | Day 7 | Day 28 |
| PAPI 17 | 1.28 | 4.86 | 25.67 | 1.42 | 7.52 | 35.47 |
| Huntsman Suprasec 9565 | 0.14 | 3.78 | 35.02 | 2.35 | 9.98 | 43.13 |
| Huntsman Rubinate 9511 | 4.50 | 29.65 | 89.43 | 4.21 | 31.98 | 88.11 |

TABLE 11

|  | Gulftene C30+ grams/layer 3 layers applied | Gulftene C30HA grams/layer 3 layers applied | Amber 185 grams/layer 3 layers applied |
|---|---|---|---|
| Jeffol A480 | 1.82 | 1.82 | 1.82 |
| ESO | 1.49 | 1.49 | 1.49 |
| Gulftene C30+ | 3.47 |  |  |

TABLE 11-continued

|  | Gulftene C30+ grams/layer 3 layers applied | Gulftene C30HA grams/layer 3 layers applied | Amber 185 grams/layer 3 layers applied |
|---|---|---|---|
| Gulftene C30HA |  | 3.47 |  |
| Calwax 170 |  |  | 3.47 |
| Polyol mix total | 6.78 | 6.78 | 6.78 |
| PAPI 17 | 2.22 | 2.22 | 2.22 |
| Total | 9.00 | 9.00 | 9.00 |

TABLE 12

Percentage Nitrogen Release (Cumulative)

|  | Before paint shaker test | | | After paint shaker test | | |
|---|---|---|---|---|---|---|
|  | Day 1 | Day 7 | Day 28 | Day 1 | Day 7 | Day 28 |
| C30+ | 1.28 | 4.86 | 25.67 | 1.42 | 7.52 | 35.47 |
| C30HA | 0.14 | 1.49 | 20.02 | 0.49 | 4.71 | 28.74 |
| Calwax 170 | 1.99 | 8.32 | 41.43 | 5.43 | 16.56 | 54.17 |

TABLE 13

|  | Percent ESO + wax level | 55 | 60 | 65 |
|---|---|---|---|---|
| grams/layer 3 layers applied | Jeffol A480 | 1.82 | 1.62 | 1.42 |
|  | ESO | 1.49 | 1.62 | 1.76 |
|  | Gulftene C30+ | 3.47 | 3.78 | 4.10 |
|  | Polyol mix total | 6.78 | 7.02 | 7.28 |
|  | PAPI 17 | 2.22 | 1.98 | 1.72 |
|  | Total | 9.00 | 9.00 | 9.00 |

TABLE 14

Percentage Nitrogen Release (Cumulative)

|  | Day 1 before P/S | Day 1 after P/S | Day 7 before P/S | Day 7 after P/S | Day 28 before P/S | Day 28 after P/S |
|---|---|---|---|---|---|---|
| 55 percent ESO and wax | 0.50 | 1.06 | 6.66 | 9.40 | 32.52 | 37.55 |
| 60 percent ESO and wax | 0.64 | 0.92 | 6.44 | 10.13 | 32.67 | 38.52 |
| 65 percent ESO and wax | 0.01 | 0.85 | 4.71 | 12.24 | 27.39 | 45.36 |

What is claimed is:

1. A controlled release fertilizer material comprising a particulate plant nutrient surrounded by at least one coating comprising the reaction product of a mixture consisting essentially of a polyol having an equivalent weight from 29 to 150, an isocyanate, a wax, an epoxidized fatty acid triglyceride oil, and optionally, a castor oil.

2. The controlled release fertilizer material defined in claim 1, wherein the epoxidized fatty acid triglyceride oil comprises an epoxidized natural fatty acid triglyceride oil.

3. The controlled release fertilizer material defined in claim 2, wherein the epoxidized natural oil comprises an epoxidized vegetable oil.

4. The controlled release fertilizer material defined in claim 3, wherein the epoxidized vegetable oil is selected from the group consisting of epoxidized soy oil, epoxidized canola oil, epoxidized corn oil, epoxidized sunflower oil and epoxidized linseed oil and mixtures thereof.

5. The controlled release fertilizer material defined in claim 4, wherein the epoxidized fatty acid triglyceride oil is epoxidized soy oil.

6. The controlled release fertilizer material defined in claim 2, wherein the epoxidized natural oil comprises an epoxidized tree seed oil.

7. The controlled release fertilizer material defined in claim 6, wherein the epoxidized tree seed oil is selected from the group consisting of epoxidized tung oil, epoxidized palm oil, epoxidized olive oil, epoxidized chestnut oil and epoxidized coconut oil and mixtures thereof.

8. The controlled release fertilizer material defined in claim 1, wherein the epoxidized fatty acid triglyceride oil is present in an amount in the range of from about 1 to about 40 percent by weight based on the total coating weight.

9. The controlled release fertilizer material defined in claim 1, wherein the epoxidized fatty acid triglyceride oil is present in an amount in the range of from about 5 to about 70 percent by weight based on the combined weight of the wax and epoxidized fatty acid triglyceride oil.

10. The controlled release fertilizer material defined in claim 1, wherein the epoxidized fatty acid triglyceride oil and the wax together comprise from about 0.1 to about 75 percent by weight of the total coating weight.

11. The controlled release fertilizer material defined in claim 1, wherein the wax comprises a natural wax.

12. The controlled release fertilizer material defined in claim 1, wherein the wax comprises a synthetic wax.

13. A controlled release fertilizer material comprising a particulate plant nutrient surrounded by at least one polyurethane coating consisting essentially of a wax, a polyol having an equivalent weight from 29 to 150, an epoxidized fatty acid triglyceride oil in an amount effective to improve mechanical handling durability of the controlled release fertilizer material, and optionally, a castor oil.

14. A process for producing a controlled release fertilizer material comprising the step of contacting a particulate plant nutrient with a polyol, an isocyanate, a wax and an epoxidized fatty acid triglyceride oil, the polyol having an equivalent weight from 29-150.

15. The process defined in claim 14, wherein the epoxidized fatty acid triglyceride oil comprises an epoxidized natural oil.

16. The process defined in claim 15, wherein the epoxidized natural oil comprises an epoxidized vegetable oil.

17. The process defined in claim 16, wherein the epoxidized vegetable oil is selected from the group consisting of epoxidized soy oil, epoxidized canola oil, epoxidized corn oil, epoxidized sunflower oil and epoxidized linseed oil and mixtures thereof.

18. The process defined in claim 17, wherein the epoxidized vegetable oil is epoxidized soy oil.

19. The process defined in claim 15, wherein the epoxidized natural oil comprises an epoxidized tree seed oil.

20. The process defined in claim 19, wherein the epoxidized tree seed oil is selected from the group consisting of epoxidized tung oil, epoxidized palm oil, epoxidized olive oil, epoxidized chestnut oil and epoxidized coconut oil and mixtures thereof.

21. The process defined in claim 14, wherein the epoxidized fatty acid triglyceride oil is present in an amount in the range of from about 0.1 to about 70 percent by weight based on the combined weight of the polyol, the isocyanate, the wax and the epoxidized fatty acid triglyceride oil.

22. The process defined in claim 21, wherein the epoxidized fatty acid triglyceride oil is present in an amount in the range of from about 1 to about 60 percent by weight based on the combined weight of the polyol, the isocyanate, the wax and the epoxidized fatty acid triglyceride oil.

23. The process defined in claim 22, wherein the epoxidized fatty acid triglyceride oil is present in an amount in the range of from about 1 to about 40 percent by weight based on the combined weight of the polyol, the isocyanate, the wax and the epoxidized fatty acid triglyceride oil.

24. The process defined in claim 23, wherein the epoxidized fatty acid triglyceride oil is present in an amount in the range of from about 20 to about 40 percent by weight based on the combined weight of the wax and epoxidized fatty acid triglyceride oil.

25. A process for producing a controlled release fertilizer material comprising the step of contacting a particulate plant nutrient with a polyol having an equivalent weight from 29-150, an isocyanate, a wax, an epoxidized fatty acid triglyceride oil in an amount effective to improve mechanical handling durability of the controlled release fertilizer material, and optionally, a castor oil.

* * * * *